United States Patent [19]

Robert

[11] Patent Number: 5,494,652
[45] Date of Patent: Feb. 27, 1996

[54] METHOD FOR PREPARING PARTICLES OF METAL OXIDE (TIN OXIDE)

[75] Inventor: Jean C. Robert, Chalon, France

[73] Assignee: Eastman Kodak Company, Rochester, N.Y.

[21] Appl. No.: 211,310

[22] PCT Filed: Sep. 16, 1992

[86] PCT No.: PCT/EP92/02137

§ 371 Date: Mar. 23, 1994

§ 102(e) Date: Mar. 23, 1994

[87] PCT Pub. No.: WO93/06040

PCT Pub. Date: Apr. 1, 1993

[30] Foreign Application Priority Data

Sep. 27, 1991 [FR] France ................................. 91 12154

[51] Int. Cl.$^6$ .......................... C01G 19/02; H01B 1/00
[52] U.S. Cl. ........................ 423/618; 423/92; 423/275; 423/87; 423/DIG. 12; 423/592; 252/518
[58] Field of Search ........................ 423/618, 593, 423/92, 87, 275, 592, DIG. 12, 622; 252/518

[56] References Cited

U.S. PATENT DOCUMENTS

| | | | |
|---|---|---|---|
| 3,793,443 | 2/1974 | Arendt | 423/594 |
| 3,810,973 | 5/1974 | Arendt et al. | 423/594 |
| 4,233,282 | 11/1980 | Arendt | 423/DIG. 12 |
| 4,246,143 | 1/1981 | Sonoda | 252/518 |
| 4,401,643 | 8/1983 | Hibst et al. | 423/594 |
| 4,614,669 | 9/1986 | Yannopoulos | 423/87 |
| 5,112,433 | 5/1992 | Dawson et al. | 423/593 |

FOREIGN PATENT DOCUMENTS

| | | |
|---|---|---|
| 0064558 | 11/1982 | European Pat. Off. . |
| 0441426 | 8/1991 | European Pat. Off. . |
| 1273507 | 7/1968 | Germany . |
| 90/15777 | 12/1990 | WIPO . |

*Primary Examiner*—Steven Bos
*Attorney, Agent, or Firm*—Alfred P. Lorenzo

[57] ABSTRACT

A fine metal oxide powder is prepared by a method comprising the steps of (1) preparing a hydroxide precursor of a metal oxide, (2) mixing the precursor with an inorganic compound having a melting point lower than the crystallization temperature of the metal oxide, and (3) subjecting the resulting mixture to a high temperature thermal treatment to form the fine metal oxide powder.

10 Claims, No Drawings

METHOD FOR PREPARING PARTICLES OF METAL OXIDE (TIN OXIDE)

The present invention relates to a method for obtaining particles of metal oxide; the invention relates also to the resulting oxide particles as veil as their use as antistatic agent, particularly for photographic films.

The metal oxide powders have various applications, particularly in the field of antistatic or conductive compositions.

A technique well known to prepare these oxides consists in precipitating a hydroxide from a salt, and then recovering this hydroxide and submitting it to a calcination treatment at a high temperature, higher than 500° C. and even 1000° C. During this calcination treatment, various phenomena can occur which modify the texture or the crystalline morphology of the metal oxide particles, and produce a sintering, i.e., a clustering of these particles. As a result, materials in the form of particles exhibiting irregular sizes are obtained. With these particles, it is difficult to prepare dispersions and coating compositions in order to obtain thin conductive or antistatic layers. Moreover, the physical properties of such layers are not very reproducible. Therefore, a mechanical treatment such as grinding, is necessary to obtain finer particles and more homogeneous powders, in order to render these materials suitable for the applications considered. However, grinding causes crystalline defects to appear in the particles, which defects must be often resorbed by means of an additional thermal treatment.

In some cases, the hydroxide precipitation is a coprecipitation, because either a second metal hydroxide or an insoluble salt of another metal is coprecipitated with the hydroxide. An example is the initial step for preparing hexaferrites of alkaline-earth metals, where a ferric hydroxide and an alkaline-earth metal carbonate are coprecipitated. This precipitate is then thermally processed at about 1000° C. in order to obtain the hexaferrite. In order to promote the reaction between hydroxide and carbonate, it is known to add a promoter which can be an alkali metal borate, PbO, $Bi_2O_3$, an alkali metal ferrite, a molybdate, an alkali metal chloride or sulfate. This method which consists in calcinating the hydroxide/carbonate mixture in the presence of the promoter, in order to accelerate a chemical reaction, is disclosed in U.S. Pat. No. 3,793,443.

However, U.S. Pat. No. 3,810,973 indicates that using, as a flux, compounds such as $B_2O_3$, alkali metal borates or halides gives variable results and accordingly, proposes to form a sodium chloride and potassium chloride mixture in situ in order to promote the formation of a ferrite.

U.S. Pat. No. 4,401,643 discloses a method for preparing barium ferrites whereby a mixture of mixed barium and iron carbonate and of sodium salt is obtained by coprecipitation; then, this mixture is heated at a temperature higher than 680° C., but lower than the sodium salt melting temperature and a finely divided ferrite powder is obtained, which is separated from the sodium salt.

Moreover, the technical literature discloses the preparation of numerous metal oxides such as ZnO, $SnO_2$, $In_2O_3$, MgO, $TiO_2$, by precipitating and calcinating the corresponding hydroxide. In this literature, it is not mentioned or suggested to use a promoter or a flux during the calcination step.

From the foregoing, it can be stated that it is still a problem to obtain metal oxides in the form of fine, homogeneous particles exhibiting a determined morphology and appropriate conductive properties. The thermal treatment of oxides and the sintering it generates remain an obstacle in this regard.

The present invention is directed to an improved method for obtaining, in a simple and economical manner, a fine powder of metal oxide exhibiting electrically conductive properties.

The method consists in preparing a hydroxide precursor of a metal oxide, mixing this precursor with an inorganic compound having a melting point lower than the crystallization temperature of said metal oxide and then submitting the resulting mixture to a thermal treatment at a high temperature.

Preferably, the method consists in precipitating the hydroxide precursor, separating and drying the resulting precipitate, mixing the precipitate with an inorganic compound having a melting point lower than the crystallization temperature of said metal oxide and submitting it to a thermal treatment at a high temperature. The inorganic compound can be incorporated after or before drying the precipitate. Inorganic compounds can be oxides such as boron oxide, or salts. Prefered compounds are salts of alkali or earth alkali metals, and more especially halides or borates of alkali or earth alkali metals. The amount of inorganic compound may vary widely depending on factors such as the nature of the hydroxide and the nature of the inorganic compound. The normally skilled man will determine in each case easily the appropriate amount to be used, but the inorganic compound to hydroxide weight ratio will be comprised generally between 0.5 and 20 and preferably between 1 and 10.

Using this inorganic compound allows one to perform the thermal treatment in a more homogeneous medium, because the seed formation and the particle growth are performed in a molten state. It results in less clustering and, finer particles exhibiting a narrower size distribution. Taking this into account, the dimension and the size distribution of the metal oxide particles depend on the characteristics of the hydroxide precipitate and on the drying method chosen.

The method of the present invention is particularly useful in order to prepare conductive oxides of transition metals such as tin, titanium, indium, molybdenum, aluminum, silicon, magnesium, barium, tungsten, vanadium, zinc or zirconium. Tin oxide is preferred. The method according to the invention can serve to prepare simple oxides, mixed oxides or doped oxides. In the case of doped oxides, doping can be performed with atoms of metals other than that of the oxide or with metalloid atoms, for example, halogen atoms. Common doping agents are disclosed in the literature and depend on the host oxide; for example, tin oxide $SnO_2$ can be doped with antimony, niobium or an halide. The amount of doping agent, varying according to the oxide nature, the doping agent nature and the applications considered, can range from 0,01 to 20 mole %.

The oxide particles are obtained from a hydroxide; this hydroxide itself can be obtained by any of the techniques well-known in this respect, particularly by precipitation by means of alkali from salts in an aqueous, hydroalcoholic or alcoholic medium, or by alkoxide hydration or by decomposition of organometallic compounds. It is often desirable to remove the salt, at the end of the process; this can be simply performed by washing with water in the case of salts such as alkali metal halides. The resistivity of the resulting oxide particles widely varies depending on the oxide nature, the possible doping but, considering applications using the conductive character of these particles, the resistivity is lower than $10^8$ ohm.cm and preferably, $10^5$ ohm.cm.

The thermal treatment conditions are well-known and disclosed in the literature. These conditions must be controlled according to their influence on the size and the morphology of the particles. It can be desirable to perform, in some cases, the thermal treatment under an inert or reactive atmosphere, for example, under a reductive atmosphere. For the thermal treatment, the hydroxide can be sprayed in a colloidal form in an oven heated at a high temperature. It can also be carried out under a vapor state or by evaporation under vacuum. The temperature of the treatment varies according to the oxide, but generally, it is ranging from 400° to 1200° C., and preferably from 600° to 900° C.

Because of their fineness, the particles obtained by the method according to the invention are particularly adapted to the preparation of thin layers or coating compositions exhibiting antistatic properties, for example, from dispersions in appropriate binders or directly from powders.

EXAMPLE 1

40 g of tin chloride IV, $SnCl_4$, $5H_2O$ and 0,94 g of antimony trichloride are dissolved in 700 ml of ethanol. After dissolution, both alcoholic solutions are mixed and this mixture is slowly poured into 750 ml of water at 90° C. in order to co-precipitate the IV tin and antimony hydroxides. This precipitate is allowed to ripen for 2 hours, then is filtered, washed and dried at 120° C.

A portion of this precipitate which is calcinated at 800° C. during 3 hours, is picked up. A tin and antimony oxide powder is thus obtained. The characteristics of this powder are illustrated in the table below.

Another portion of the precipitate, mixed with KCl according to a KCl/precipitate weight ratio equal to 7.3, is picked up. This mixture is submitted to a 3 hour thermal treatment at 800° C. The characteristics of the resulting powder are illustrated in Table I below. The specific surfaces are measured by the well known BET absorption technique. The resistances are measured on oxide pellets compacted under a pressure of 500 kg/cm².

TABLE I

| | Chemical treatment | Salt | Specific surface (m²/g) | Resistance ohm · cm |
|---|---|---|---|---|
| 1-a | 800° C.-3h | — | 17.2 | <10 |
| 1-b | 800° C.-3h | KCl | 51.8 | <10 |

The increase in the specific surface shows the sintering reduction between the particles during the thermal treatment, and thus, a better dispersibility. These dispersions can be applied as homogeneous thin layers exhibiting conductive and antistatic properties.

EXAMPLE 2

The procedure of example 1 is repeated, except that, after precipitation, the precipitate is separated and dried by spraying.

A portion of the precipitate is simply thermally treated, while another portion is mixed with KCl according to a KCl/precipitate weight ratio equal to 7.3, then thermally treated. Conditions of thermal treatment are those specified in Table II below.

TABLE II

| | Chemical treatment | Salt | Specific surface (m²/g) | Resistance ohm · cm |
|---|---|---|---|---|
| 2-a | 700° C.-1h | — | 26.9 | 20 |
| 2-b | 700° C.-1h | KCl | 72.3 | 130 |

I claim:
1. A method of preparing a fine tin oxide powder comprising the steps of:
  (1) precipitating tin hydroxide;
  (2) mixing said tin hydroxide with an inorganic compound having a melting point lower than the crystallization temperature of tin oxide to form a mixture; and
  (3) subjecting said mixture to a high temperature thermal treatment at a temperature of from 400° C. to 1200° C. to form said fine tin oxide powder.

2. A method of preparing a fine tin oxide powder that has electrically-conductive properties comprising the steps of:
  (1) co-precipitating tin hydroxide together with a doping agent to form a co-precipitate,
  (2) mixing said co-precipitate with an inorganic compound having a melting point lower than the crystallization temperature of tin oxide to form a mixture, and
  (3) subjecting said mixture to a high temperature thermal treatment at a temperature of from 400° C. to 1200° C. to form said electrically-conductive fine tin oxide powder.

3. A method as claimed in claim 2, wherein said doping agent is antimony.

4. A method as claimed in claim 2, wherein said inorganic compound is a halide or borate of an alkali or earth alkali metal.

5. A method as claimed in claim 2, wherein the weight ratio of said inorganic compound to said tin hydroxide is between 0.5 and 20.

6. A method as claimed in claim 2, wherein the weight ratio of said inorganic compound to said tin hydroxide is between 1 and 10.

7. A method as claimed in claim 2, wherein said doping agent is employed at a concentration of from 0.01 to 20 mole percent.

8. A method as claimed in claim 2, wherein said high temperature thermal treatment is at a temperature of from 600° C. to 900° C.

9. A method of preparing a fine tin oxide powder that has electrically-conductive properties comprising the steps of:
  (1) co-precipitating tin hydroxide and antimony hydroxide to form a co-precipitate;
  (2) mixing said co-precipitate with an inorganic compound having a melting point lower than the crystallization temperature of tin oxide to form a mixture; and
  (3) subjecting said mixture to a high temperature thermal treatment at a temperature of from 600° C. to 900° C. to form said fine electrically-conductive tin oxide powder.

10. A method of preparing a fine tin oxide powder that has electrically-conductive properties comprising the steps of:
  (1) co-precipitating tin hydroxide and antimony hydroxide to form a co-precipitate;
  (2) mixing said co-precipitate with potassium chloride to form a mixture; and
  (3) subjecting said mixture to a high temperature thermal treatment at a temperature of from 600° C. to 900° C. to form said fine electrically-conductive tin oxide powder.

* * * * *